United States Patent [19]

Robinson et al.

[11] Patent Number: 5,339,698

[45] Date of Patent: Aug. 23, 1994

[54] VIBRATING BEAM FORCE TRANSDUCER WITH AUTOMATIC ADJUSTMENT OF ITS ELECTROMAGNETIC DRIVE

[75] Inventors: Michael J. Robinson, Mukilteo; James R. Woodruff, Redmond, both of Wash.

[73] Assignee: AlliedSignal Inc., Morris Township, Morris County, N.J.

[21] Appl. No.: 72,903

[22] Filed: Jun. 7, 1993

[51] Int. Cl.$^5$ .............................................. G01L 1/00
[52] U.S. Cl. ............................ 73/862.59; 73/862.623
[58] Field of Search ........ 73/862.59, 517 AV, DIG. 1, 73/704, 862.41

[56] References Cited

U.S. PATENT DOCUMENTS

| | | | |
|---|---|---|---|
| 4,155,257 | 5/1979 | Wittke | 73/DIG. 1 |
| 4,372,173 | 2/1983 | EerNisse et al. | 73/862.59 |
| 4,912,990 | 4/1990 | Norling | 73/862.59 |
| 5,142,913 | 9/1992 | Delatorre | 73/862.44 |

Primary Examiner—Richard E. Chilcot, Jr.
Assistant Examiner—R. Biegel
Attorney, Agent, or Firm—Howard G. Massung

[57] ABSTRACT

A vibrating beam force transducer is comprised of an oscillating sensing element having a frequency output indicative of the force applied to the sensing element. The sensing element has a variable electrical resistance which can vary in accordance with temperature fluctuations over the operating range of the transducer.

A drive circuit is electrically coupled to the sensing element for causing the sensing element to oscillate at a resonant frequency that is a function of the force applied to the sensing element. The drive circuit includes a source of DC voltage, which is utilized for altering the electrical characteristics of the drive circuit in response to variations in the electrical resistance of the sensing element.

10 Claims, 3 Drawing Sheets

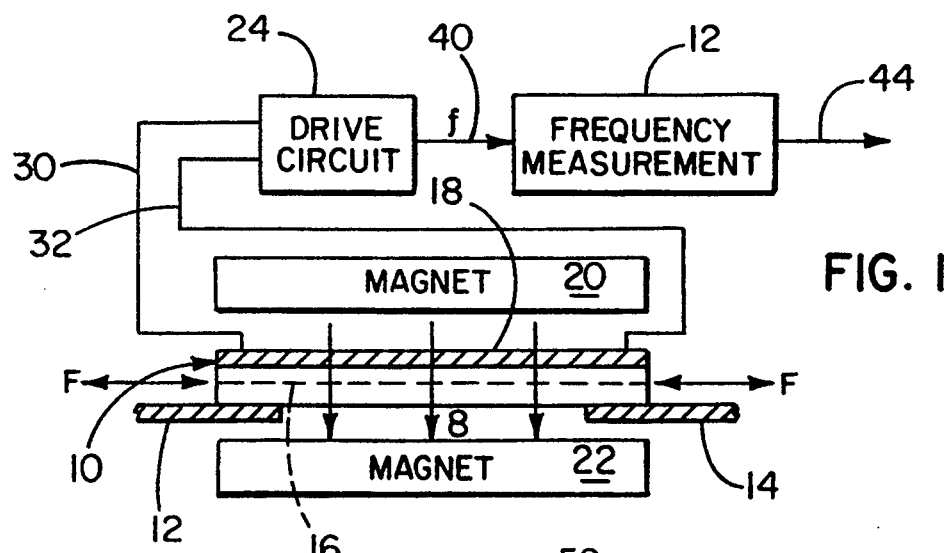
FIG. 1
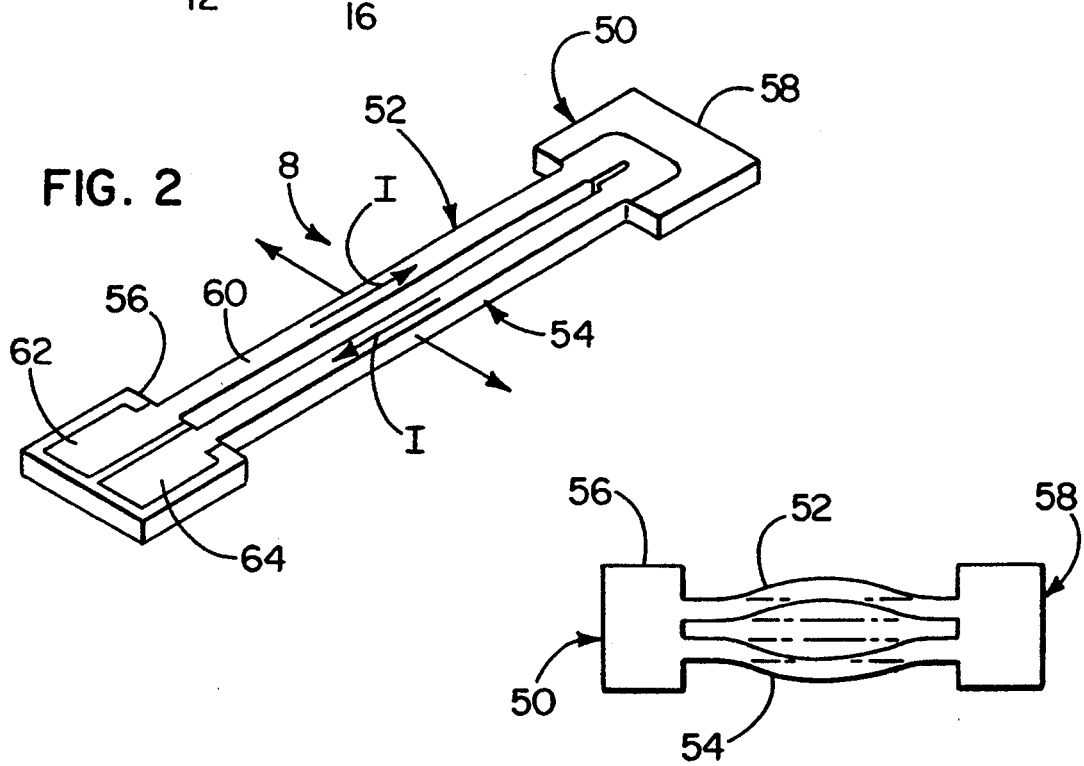
FIG. 2
FIG. 3
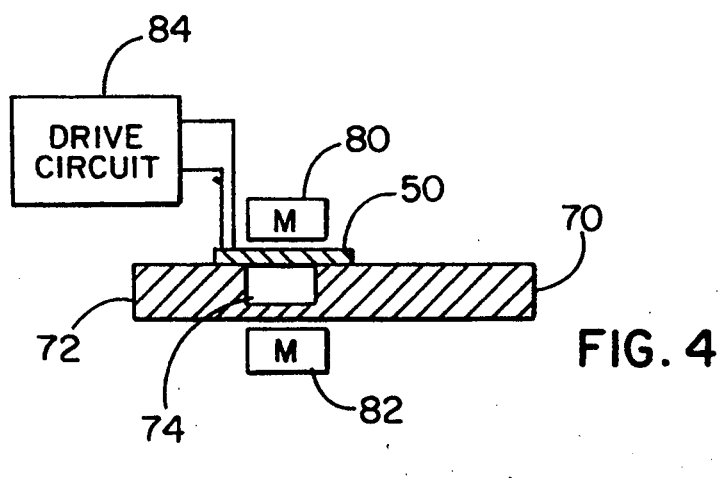
FIG. 4

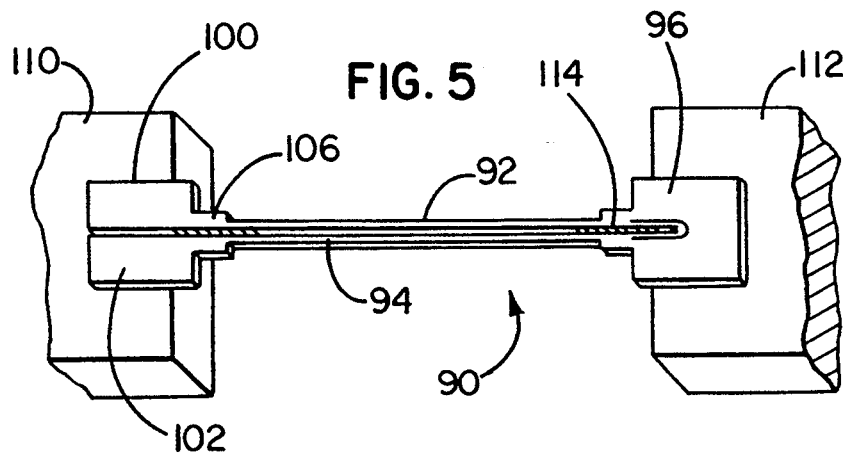
FIG. 5
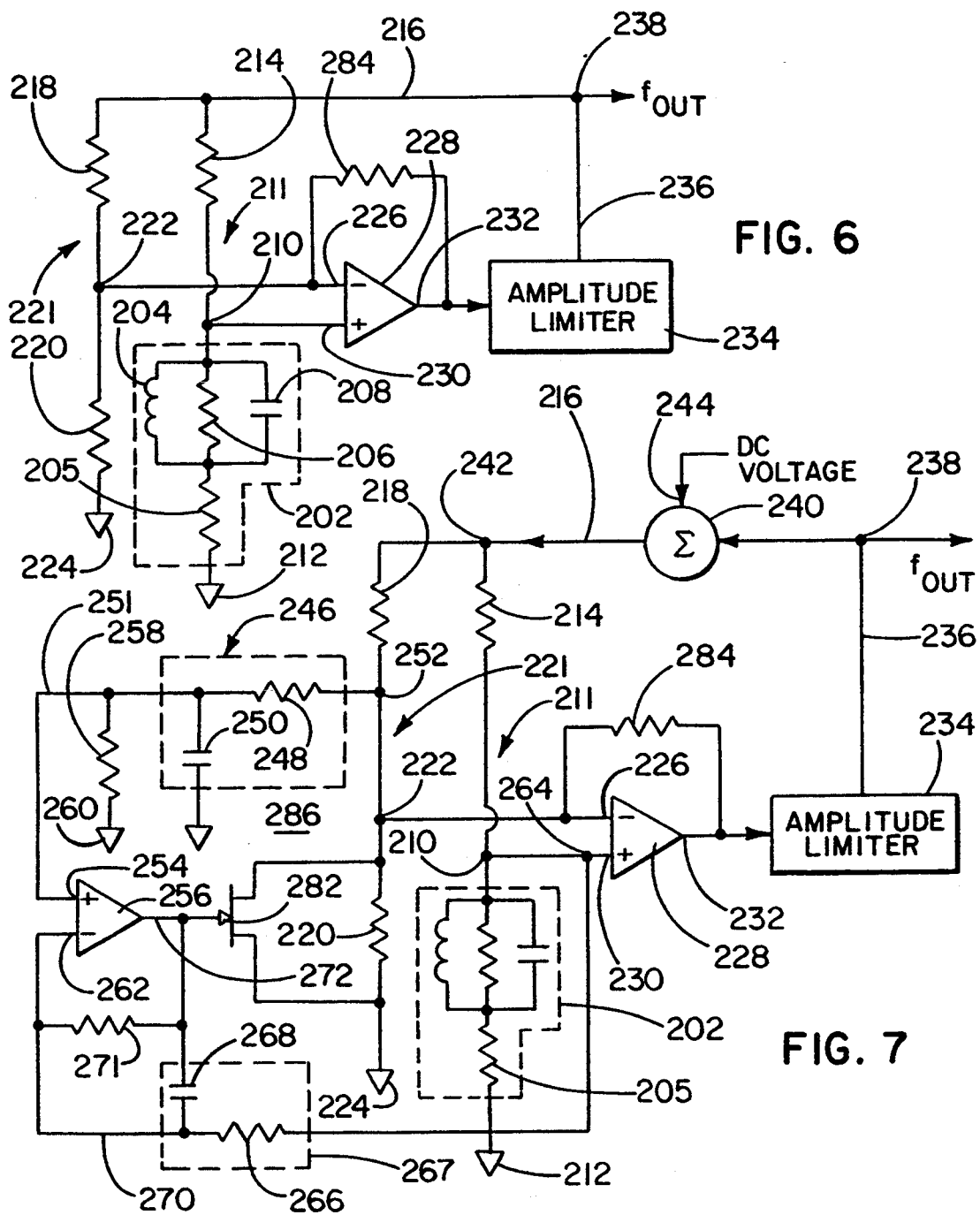
FIG. 6
FIG. 7

VIBRATING BEAM FORCE TRANSDUCER WITH AUTOMATIC ADJUSTMENT OF ITS ELECTROMAGNETIC DRIVE

FIELD OF THE INVENTION

This invention relates generally to force transducers, and more particularly to an improved electromagnetic drive circuit for a force transducer that provides automatic compensation through the use of direct current (DC) voltage in order to stabilize the resonator electrical Q.

BACKGROUND OF THE INVENTION

Vibrating beam force transducers are often used as force-to-frequency converters in accelerometers, pressure sensors and related instruments. In one well-known design, described in U.S. Pat. No. 4,372,173, the force transducer is in the form of a double-ended tuning fork fabricated from crystalline quartz. The transducer comprises a pair of side-by-side beams that are connected to common mounting structures at their ends. Electrodes are deposited on the beams in predetermined patterns, and the electrodes are connected to a drive circuit. The drive circuit provides a periodic voltage that causes the beams to vibrate toward and away from one another, 180° out of phase. In effect, the drive circuit and beams form an oscillator, with the beams playing the role of the frequency control crystal, i.e., a mechanical resonance of the beams controls the oscillation frequency. A tension force applied along the beams increase the resonant oscillation frequency. The frequency of the drive signal is thereby a measure of the force applied axially along the beams.

Vibrating beam force transducers require materials with low internal damping, to achieve high Q values that result in low drive power, low self-heating, and insensitivity to electronic component variations. Transducer materials for high-accuracy instruments also require extreme mechanical stability over extended cycles at high stress levels. One of the key problems in producing such transducers involves the drive and position pick-off measurement. Crystalline quartz is the most commonly used material for mechanical transducers because of its piezoelectric properties, which properties provide the ability to drive and sense mechanical motion through the use of a simple surface electrode pattern.

With the advent of low cost, micromachined mechanical structures fabricated from crystalline silicon, it has become desirable to create silicon vibrating beam transducers. However, silicon does not possess piezoelectric properties for driving and sensing beam vibration. It was therefore desirable to provide a method of exciting and sensing the resonance of a silicon beam, without adding substantial costs, mechanical instabilities, or excessive complexity. One prior approach to this problem was described in U.S. Pat. No. 4,912,990, issued to the assignee of the present invention. The invention described in the '990 patent provides a vibrating beam force transducer that can be realized in a silicon micromachined structure. The force transducer is of the type comprising a beam having a longitudinal axis, and drive circuitry electrically coupled to the beam for causing the beam to oscillate at a resonant frequency that is a function of a force applied along the longitudinal axis of the beam. Magnetic means are provided for creating a magnetic field that intersects said axial component. Motion of the beams in the magnetic field generates a signal voltage. This voltage is amplified, and the amplified voltage drives current along a conduction means physically coupled to the beam. The electric current flowing along the current path thereby interacts with the magnetic field, so as to produce a force on the beam that causes the beam to oscillate at the resonant frequency.

One difficulty which has arisen with respect to the drive means utilized in the prior art concerns variations caused by temperature cycling of the transducer and its drive circuitry.

In a particular drive circuit utilized in conjunction with a doubled-ended tuning fork (DETF) in a force transducer of the type described in the '990 patent, the tuning fork is covered by oxide and a conducting layer of gold is applied over the oxide to provide an electrically conducing path. This conducting path traverses from a first end of one tine to the other end of the tuning fork, across the adjacent end of the other tine, and back along the second tine to the end of the second tine adjacent to the first end of the first tine. There is a voltage difference between electrical connections to the ends of this conducting path which comprises two components: a first component generated by the motion of the tines in the magnetic field; and a second component caused by the flow of the drive current through the electrical resistance of the conducting path and any leads between the connections and the tines. A bridge is formed of two voltage dividers, one of which includes the conducting path along the tines and any leads, permits a differential amplifier to subtract out the second voltage component. The resistance of the bridge components can change with temperature. The problem arises most particularly with respect to the resistor in series with the double-ended tuning fork. The gold conducting path on the tuning fork, and any gold leads from the resistor in series with this path, change resistance with temperature, so that the voltages from the two voltage dividers are not the same, in which case the effective electrical Q of the resonator is significantly degraded, and the oscillator works poorly or does not work at all. One method which can be utilized to compensate for this is by forming the appropriate resistor of the parallel divider by depositing gold on an insulating outside layer of the silicon at the same time the gold conducting path on the tuning fork is deposited. It can be difficult or impractical to apply the gold so that its change in resistance matches that of the gold on the tuning fork. Also, this may then necessitate trimming of the resistor, which is an undesireable requirement in production.

It therefore is desirable to provide an electric drive circuit for the magnetically driven force transducer which compensates for any differences in resistance which may occur as a result of temperatures cycling over the operating range of the device.

SUMMARY OF THE INVENTION

The present invention overcomes the shortcomings of the prior art in providing a force transducer which is comprised of an oscillating sensing element having a frequency output indicative of the force applied to the sensing element. The sensing element has a variable electrical resistance which varies in accordance with temperature fluctuations over the operating range of the transducer. The present inventions compensates for this change in resistance, which would otherwise degrade performance.

A drive circuit is electrically coupled to the sensing element for causing the sensing element to oscillate at a resonant frequency that is a function of the force applied to the sensing element. The drive circuit includes a source of DC voltage, which is utilized for altering the drive circuit in response to variations in the electrical resistance of the sensing element.

BRIEF DESCRIPTION OF THE DRAWINGS

Reference is now made to the description of the preferred embodiments, illustrated in the accompanying drawings, in which:

FIG. 1 is a schematic view illustrating the force transducer of the present invention;

FIG. 2 is a preferred embodiment of a transducer body;

FIG. 3 is a top plan view schematically illustrating a preferred resonant mode for the transducer of FIG. 2;

FIG. 4 is a schematic view illustrating the use of a force transducer in a micromachined accelerometer;

FIG. 5 is a perspective view of a further preferred embodiment of the transducer body;

FIG. 6 is an electrical schematic illustrating a drive circuit which has been utilized with the force transducer of FIGS. 1 and 5;

FIG. 7 is an electrical schematic illustrating the preferred embodiment of the drive circuitry utilized in this invention;

DETAILED DESCRIPTION OF THE INVENTION

Figure 8:
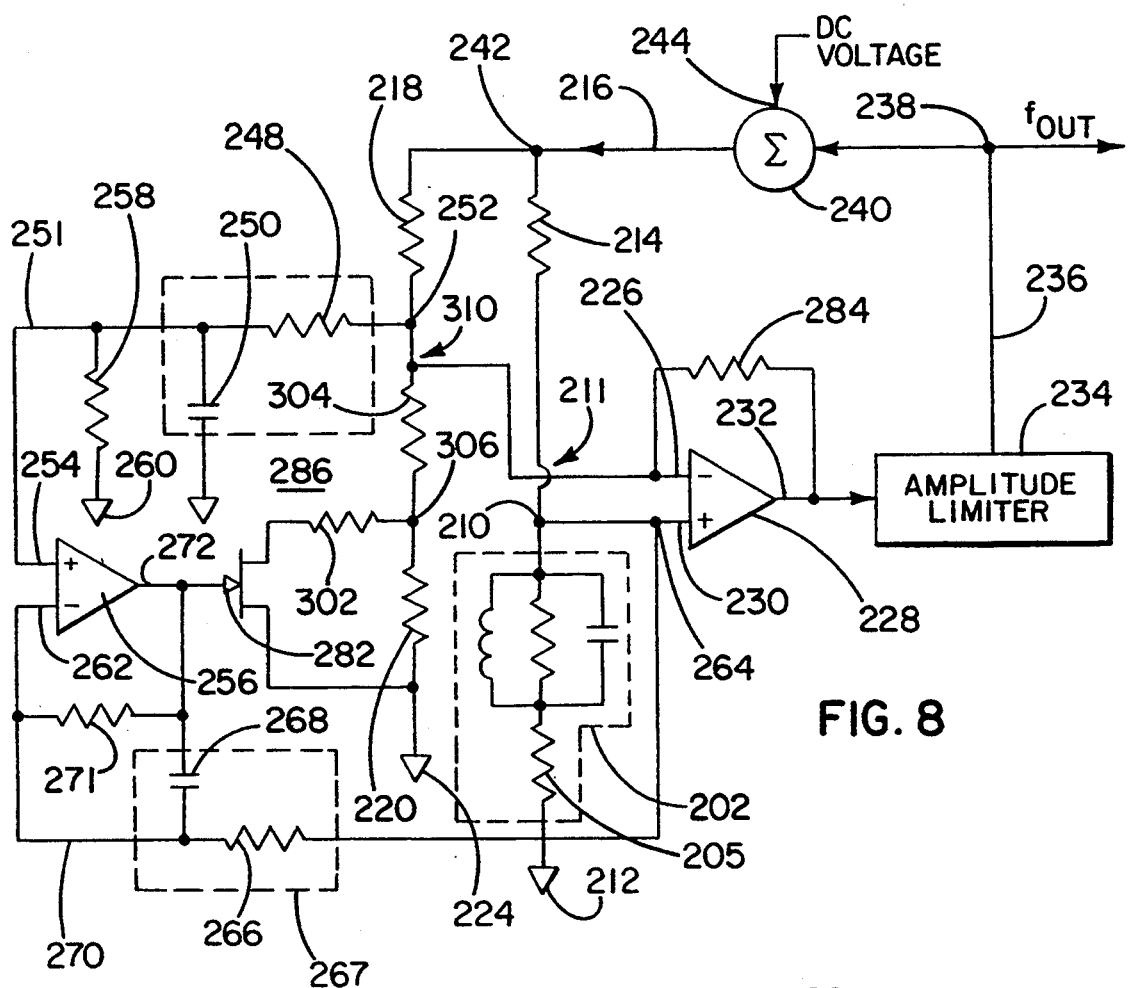
FIG. 8 is an electrical schematic illustrating a modification to the electric circuit illustrated in FIG. 7.

FIG. 1 schematically illustrates a force transducer according to the present invention. The transducer comprises a beam 10, magnets 20 and 22, and the drive circuit 24. The beam 10 is connected between structures 12 and 14 along longitudinal axis 16 thereof, and includes an electrically conductive region 18 that extends generally parallel to the axis 16. Structures 12 and 14 exert a tension or compression force F on the beam 10. The magnets 20 and 22 produce a magnetic field B that passes through the beam 10, and in particular through the conductive region 18, in a direction generally normal to the axis 16.

The drive circuit 24 is connected to the conductive region 18 by lines 30 and 32, and causes a periodic current to flow through the conductive region. Flow of current along region 18 interacts with the magnetic field B, to produce a periodic force on the beam 10. In the arrangement shown in FIG. 1, this force is directed into and out of the plane of the drawing, thereby causing the beam 10 to oscillate along such direction. The drive circuit 24, in combination with the beam 10, forms an electrical oscillator that oscillates at a frequency determined by the mechanical resonance of the beam. The frequency of such resonance in turn depends upon the axial force F exerted on the beam by structures 12 and 14. The drive circuit 24 thereby produces an output signal on line 40 at a frequency f that is a function of the axial force F. The frequency measurement circuit 42 measures the frequency of this signal, which typically will be on the order of one hundred kilohertz (100 KHz), to produce an output signal on line 44 that provides a measure of force F.

In the arrangement shown in FIG. 1, the drive circuit 24 provides two functions. First, the drive circuit 24 provides the electrical energy that causes current to travel along path 18. Second, the drive circuit frequency locks to the mechanical resonance of the beam 10, so that the drive circuit 24 also provides a pick off means for determining the oscillation frequency.

A preferred embodiment of the transducer of the present invention is shown in FIG. 2. The illustrated transducer includes a body 50 having the overall form of a double-ended tuning fork (DETF), the body 50 including parallel beams 52 and 54 interconnected at their ends by the mounting pads 56 and 58. A conductive (e.g., metallic) trace 60 is deposited on the upper surface of the body 50, and extends from a first contact 62 on the mounting pad 56, along the beam 52 to the mounting pad 58, and then back along the beam 54 to a second contact 64 also on the mounting pad 56. Contacts 62 and 64 are in turn connected to the drive circuit 24. If the beam is of an electrically conducting material such as silicon crystal, a layer of insulating material is provided before deposition of the conductive trace. For example, oxide may be grown as silicon.

A magnetic field B is generated in a direction perpendicular to the beams 52 and 54 and to the plane in which the body 50 is formed. As a result, a current I passing through the trace 60 from the contact 62 to the contact 64, in the direction indicated by the arrows in FIG. 2 produces outwardly directed forces on the two beams. When the current flow direction is reversed, inwardly directed forces are produced. As a result, the beams can be made to oscillate in the triplanar symmetric mode shown in FIG. 3.

In this mode, the beams vibrate towards and away from one another, 180° out of phase. This mode of oscillation is preferred, because it tends to cause cancellation of the stresses coupled into mounting pads 56 and 58, thereby minimizing the amount of mechanical energy transmitted through the mounting pads into the structures to which the mounting pads are attached.

FIG. 4 schematically illustrates the use of a transducer of the type shown in FIG. 2 in an accelerometer. The accelerometer includes a proof mass 70 connected to a support 72 by the flexure 74, and a transducer body 50 extending between the proof mass 70 and support 72 in a direction generally parallel to the flexure 74. A pair of magnets 80 and 82 produce a magnetic field normal to the axis of the body 50, and the body is connected to a drive circuit 84 that provides periodic current flow through the transducer beams. In this application, the transducer shown in FIG. 2 has the advantage that both of the electrical contacts of the transducer are positioned on the same mounting pad, so that an electrical connection to the proof mass 70 is unnecessary.

An accelerometer of the type shown in FIG. 4 can be fabricated by means of known silicon micromachining techniques. For example, one could commence with a wafer of P-type silicon having N-doped epitaxial layers on both surfaces. The epitaxial layer on the upper surface could be etched to form transducer body 50, while the epitaxial layer on the lower surface could be etched to form flexure 74, in both cases using an electrochemical etch stop. Alternatively, transducer body 50 could lie in the plane of the upper surfaces of proof mass 70 and support 72, with the transducer body again being formed from an N-doped epitaxial layer.

The transducers described above all include conductive regions or traces within the transducer beam or beams. FIG. 5 illustrates an embodiment in which the entire beams conduct the current provided by the drive circuit. This embodiment includes body 90 comprising beams 92 and 94 that are connected to common mounting pad 96 at one end, and that form a pair of separating mounting pads 100 and 102 at their opposite ends. Body 90 is constructed from a conductive material, such as conductive silicon, silicon dioxide, silicon nitride, silicon epitaxy, etc. Structures 110 and 112 comprise a nonconductive material, such as nonconductive bulk silicon. Mounting pads 100 and 102 are connected to structure 110, which could for example comprise a support in an accelerometer, and mounting pad 96 is connected to structure 112, which could for example comprise a proof mass in an accelerometer. Mounting pads 100 and 102 comprise the electrical contacts for connection to the drive circuit.

A nonconductive filler 106 is positioned between a portion of mounting pads 100 and 102, to provide mechanical beam-to-beam coupling without permitting electrical current to flow therebetween. Filler 106 could comprise an oppositely doped material that formed a diode junction with transducer body 90. Optionally, a second nonconductive filler 114 may be positioned between beams 92 and 94 at mounting pad 96, to provide mechanical symmetry. The additional mechanical coupling between the beams that is provided by the fillers helps ensure that both beams resonate at the same frequency. The symmetry provided by filler 114 is important for dynamic balance to minimize energy loss to the surrounding structure. Fillers 106 and 114 overlie respective structures 110 and 112 to a degree sufficient to make both ends appear elastic or identical with respect to beam coupling, despite their functional dissimilarity.

Referring now more particularly to FIG. 6, therein is illustrated a drive circuit which can be utilized for driving the double-ended tuning fork (DETF) illustrated in FIGS. 2 and 5. The DETF 202 can be electrically schematically illustrated as the parallel combination of the inductor 204, the resistor 206, and the capacitor 208, and the resistor 205 in series therewith. The resistor 205 is variable; that is, the DC resistance of the DETF can vary as the DETF cycles over its operating temperature range. The DETF 202 is connected in the circuitry between node 210 and ground 212. A resistor 214 is connected in series with the DETF 202, and is connected between node 210 and line 216, with the DETF 202 and the resistor 214 forming a voltage divider 211.

Connected in parallel with the voltage divider 211 so as to form a bridge are serially connected resistors 218, 220, with node 222 being disposed therebetween to form the voltage divider 221. Resistor 220 is further connected to ground 224.

The node 222 between resistors 218, 220 is connected to the negative input terminal 226 of the differential amplifier 228. The positive input 230 of the differential amplifier 228 is connected to node 210. A resistor 284 is connected between the negative input terminal 226 and the output terminal 232 of the first differential amplifier 228. The output 232 of differential amplifier 228 is connected to an amplitude limiter 234 which limits the magnitude of the voltage that is being exited by the differential amplifier 228. The output 236 of the amplitude limiter 234 is connected to line 216 at node 238. The node 238 is also utilized as the connection point for the frequency measurement circuit 42 (FIG. 1) which generates an output signal that provides a measure of the force F being exerted on the DETF 202.

In operation, the resistance of resistor 214 is high when compared to that of the DETF 202. The resistor 214 converts the voltage from the amplitude limiter 234 to the current required to drive the DETF at a desired amplitude. At the node 210 there is present a voltage with two components; a first component equal to the product of the DETF drive current and the resistance of the element 205, and a second component generated by the DETF 202 vibrating in the magnetic field. The resistors 218, 220 are chosen so that the output of their divider 221 at node 222 is equal to the first component of the divider 211 at its output node 210. The two dividers 211, 221 form a bridge 225, as mentioned previously and, if properly balanced, the output of this bridge 225 is the voltage generated by the DETF 202 vibrating in the magnetic field. The bridge output is sensed by the differential amplifier 228 so that the voltage amplified and applied to the voltage limiter 234 is that generated by the DETF 202.

The problem with the circuitry illustrated in FIG. 6 has been previously mention; that is, that the gold conducting path on the DETF 202 and the gold leads from the resistor 214 change resistance with temperature, so that the voltages from the two dividers may not be the same and the oscillator works poorly or does not work at all.

To overcome the deficiencies of the drive circuit illustrated in FIG. 6, the drive circuit schematically illustrated in FIG. 7 was developed. In FIG. 7, like elements will retain their same reference numerals as were present in FIG. 6. In this preferred embodiment, an adder 240 is connected in line 216 between output node 238 and bridge junction node 242. A second input 244 to the adder 240 is present, and a DC voltage is inserted into the circuit at the adder 240.

A low pass filter 246, comprised of the resistor 248 and capacitor 250, is connected between node 252 (situated between resistors 218, 220), and the positive terminal 254 of a second differential amplifier 256 through line 251. A resistor 258 is also connected between line 251 and ground 260.

The negative input 262 of the second differential amplifier 256 is connected in a feedback loop through line 270 to a node 264 which is electrically connected to the positive input 230 of the first differential amplifier 228 and the output node 210 of the voltage divider 211. A low pass filter 267, comprised of resistor 266 and capacitor 268, is inserted into the line 270. A further resistor 271 is connected in parallel with capacitor 268 between line 270 and the output 272 of the differential amplifier 256. The total frequency response of the amplifier 256 is determined by the interaction of low pass filters 246, 267.

A n-channel field effect transistor 280 is connected across the resistor 220, and its gate 282 is connected to the output 272 of the second differential amplifier 256. Although not illustrated, it will be appreciated by those skilled in the art that a p-channel field effect transistor could be utilized in place of the n-channel transistor 280 illustrated, provided that the required control polarities for that particular device are implemented.

The operation of the drive circuitry is as follows. The force F exerted on the tines of the DETF causes them to resonate, causing a voltage to be generated and amplified by the differential amplifier 228. This DETF voltage is then limited by the amplitude limiter 234, and is fed through output 236 to the adder 240, The voltage exiting from the adder 240 contains both AC and DC components and is applied to the bridge formed by voltage dividers 211, 221, to thereby drive the tines of the DETF 202. The output of the divider 221 is filtered by the low pass filter 246 to remove the AC component thereof, and thus only a DC component is present on the line 251 as it is input into the positive terminal of the differential amplifier 256. At the same time, the output of the voltage divider 211, again containing both AC and DC components, is filtered through the low pass filter 267 to remove the AC components, and only a DC component is then present at the negative input 262 of the second differential amplifier 256. This amplifier 256 subtracts the components from each other, and amplifies this difference to thereby drive the gate 282 of the FET to vary the resistance of the FET 280. Since this resistance is in parallel with resistor 20, the varying in resistance of the FET 280 causes the total resistance of the parallel pair to vary so as to drive the DC component at the output 232 of the amplifier 228 to zero. Thus, the resistance of the parallel combination resistor 220-FET 280 is brought into balance and tracking with the DC resistance 205 of the DETF 202, and the voltage at the output of first differential amplifier 228 is proportional solely to the voltage generated by the vibrating DETF 202.

Referring now more particularly to FIG. 8, therein is shown a modification to the drive circuit illustrated in FIG. 7. In the modification illustrated in FIG. 8, a resistor 304 has been inserted in the voltage divider 310, in series with the resistor 220 between node 222 and the resistor 220. An additional resistor 302 has been inserted in the shunt circuit between the node 306 and the FET 280. The remainder of the circuit remains the same as was illustrated in FIG. 7. In this embodiment, finer control of the resistance matching between the FET 280 and the DEFT 202 can be obtained, because of the additional resistance 302, 304 being added in series with each of these elements, respectively.

Figure 9:
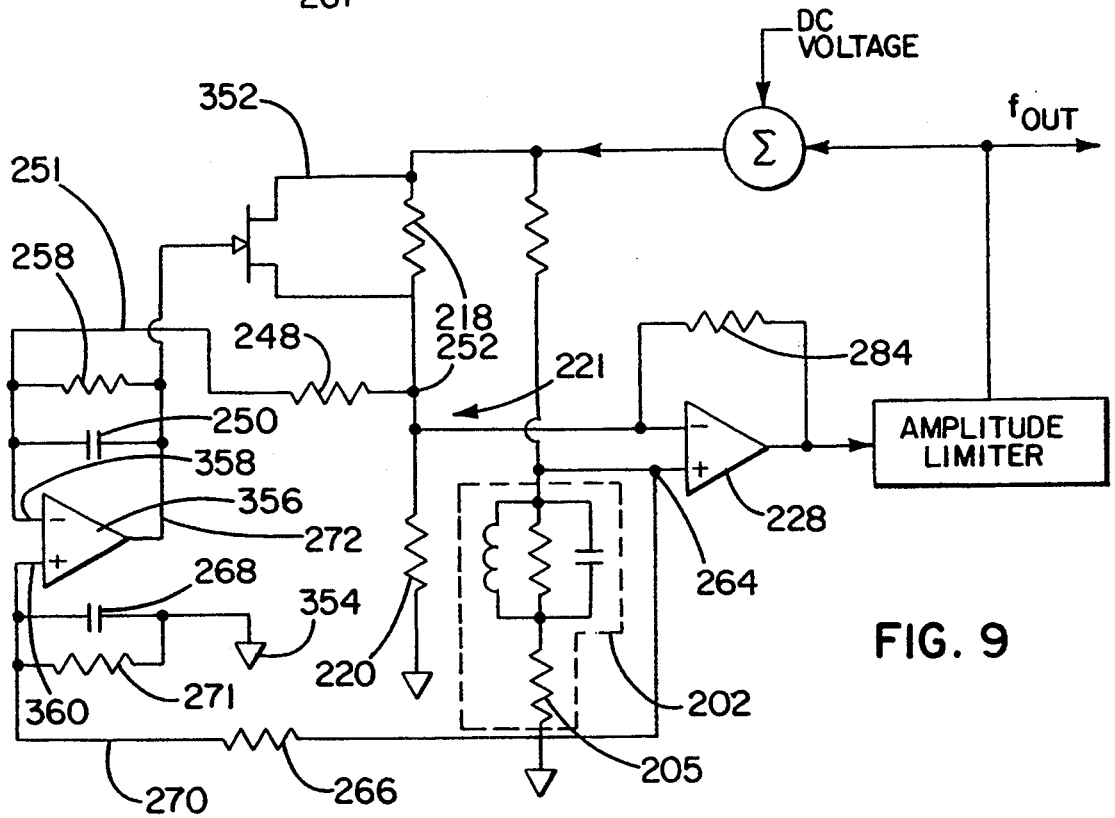
FIG. 9 is a further alternative embodiment of the electrical circuit illustrated in FIG. 7.

Another embodiment of the drive circuit described with reference to FIG. 7 is illustrated in FIG. 9. This further embodiment essentially illustrates that the FET 352 can be utilized to shunt the resistor 218 of the voltage divider 221 remote from the DETF 202, instead of only shunting the resistor 220 opposite the DETF 202 as shown in FIG. 7.

The line 270 now extends from the node 264 at the positive input of the first differential amplifier 228 through the resistor 266 to the positive input 360 of the second differential amplifier 356. The resistor 271 and the capacitor 268 now extend from line 270 to ground 354, instead of to the output 272 of the amplifier 256 as shown in FIG. 7. The line 251 now extends from the node 252 through resistor 248 to the negative input 358 of the differential amplifier 356. The resistor 258 and the capacitor 250 now extend from the line 251 to the output line 272 of the differential amplifier 356. The output line 272 of the amplifier 356 now is connected to the gate of the n-channel FET 352 which is connected in parallel with the resistor 218 of the voltage divider 221. The functioning of the circuit is basically the same as heretofore described with respect to FIG. 7, except that the resistance of the remote side of the voltage divider 221 is being varied to drive the DC component of the output of the amplifier 228 to zero.

Therefore, what has been described is an electric drive circuit for a magnetically driven force transducer which compensates for any differences in conduction which may occur as a result of temperatures cycling over the operating range of the device. It should be readily appreciated that, although the description of the invention was specific to the implementation of the circuit in connection with a DETF, the invention is not to be so limited, and indeed, the self-adjusting drive circuitry of this invention is also applicable for use in connection with any oscillating sensing element.

We claim as our invention:

1. A force transducer comprising:
   a double-ended tuning fork operating as an oscillating sensing element having a frequency output indicative of the force applied to the sensing element, said sensing element having a variable electrical resistance; and,
   drive means electrically coupled to the sensing element for causing the sensing element to oscillate at a resonant frequency that is a function of the force applied to the sensing element, said drive means including resistance means having a resistance electrically in parallel with said sensing element, said drive means further including DC voltage means operating to vary the resistance of said resistance means in response to variations in said sensing element electrical resistance; and
   said resistance means including a resistance element disposed electrically in parallel with said sensing element, a field-effect transistor disposed electrically in parallel with said resistance element, and said DC voltage means operating to vary the resistance of said field-effect transistor.

2. A force transducer comprising:
   an oscillating sensing element having a frequency output indicative of the force applied to the sensing element, said sensing element having a variable electrical resistance;
   drive means electrically coupled to the sensing element for causing the sensing element to oscillate at a resonant frequency that is a function of the force applied to the sensing element, said drive means comprising:
   a first voltage divider comprised of a resistance element electrically serially connected to said sensing element and having a first output node therebetween;
   a second voltage divider, comprised of at least two resistance elements electrically serially connected to each other with a second output node therebetween, connected electrically in parallel with said first voltage divider;
   comparator means coupled to said first and second output nodes for determining the difference in output between said first and second output nodes;
   said comparator means including a first differential amplifier whose output is the difference in voltage of said first and second output nodes, said first differential amplifier output being electrically coupled to said first and second voltage dividers;
   compensating means, including a source of DC voltage, coupled to said second voltage divider for altering the resistance of said second voltage divider in response to variations in the resistance of said sensing element;

said compensating means including a field-effect transistor connected in parallel with one of said second voltage divider resistance elements, said field-effect transistor being electrically coupled to said source of DC voltage; and said compensating means further including a second differential amplifier having first and second input terminals and an output terminal, said second amplifier first input terminal being electrically connected to said first output node and said second amplifier second input terminal being electrically connected to said second output node, the output of said second amplifier being the amplified difference in value of the voltages supplied to said first and second input terminals, means for filtering out high frequency components from the electrical signals being input to said second amplifier first and second input terminals, and means for electrically connecting said second amplifier output terminal to said field-effect transistor, said field-effect transistor being responsive to changes in the output signal from said second amplifier output terminal.

3. A drive circuit for a force transducer of the type comprising an oscillating sensing element having a variable electrical resistance and having a frequency output indicative of the force applied to the sensing element, said drive circuit being electrically coupled to the sensing element for causing the sensing element to oscillate at a resonant frequency that is a function of the force applied to the sensing element, said drive circuit comprising:

a first voltage divider comprised of a resistance element electrically serially connected to said sensing element and having a first output node therebetween;

a second voltage divider, comprised of at least two resistance elements electrically serially connected to each other with a second output node therebetween, connected electrically in parallel with said first voltage divider, said first and second voltage dividers being electrically connected into an electrical bridge;

comparator means coupled to said first and second output nodes for determining the difference in output between said first and second output nodes;

feedback means for electrically coupling the output of said comparator means to said electrical bridge, said feedback means including a source of DC voltage; and, compensating means, including a field-effect transistor disposed electrically in parallel with at least one of said second voltage divider resistance elements, for altering the resistance of said second voltage divider in response to variations in the resistance of said sensing element, said compensating means being operationally responsive to variations in value of signals received from said first and second output nodes.

4. The drive circuit in accordance with claim 3 wherein said compensating means includes a compensation differential amplifier having first and second inputs and an output, said compensation differential amplifier output being electrically connected to said field-effect transistor, said compensation differential amplifier first and second inputs being electrically connected to said first and second output nodes respectively.

5. The drive circuit in accordance with claim 4 wherein said compensating means includes first filter means electrically coupled to said compensation differential amplifier first input for removing high frequency voltage components from the signal being supplied to said compensation differential amplifier first input.

6. The drive circuit in accordance with claim 5 wherein said compensating means includes second filter means electrically coupled to said compensation differential amplifier second input for removing high frequency voltage components from the signal being supplied to said compensation differential amplifier second input.

7. The drive circuit in accordance with claim 6 wherein said first voltage divider is electrically connected between said feedback means and ground potential, said second voltage divider is electrically connected between said feedback means and ground potential, and said sensing means is disposed in said first voltage divider between said first output node and ground potential.

8. The drive circuit in accordance with claim 7 wherein one of said second voltage divider resistance elements is disposed electrically between said second output node and ground potential.

9. The drive circuit in accordance with claim 8 wherein said field-effect transistor is disposed electrically in parallel with the second voltage divider resistance element which is disposed between said second output node and ground potential.

10. The drive circuit in accordance with claim 8 wherein said field-effect transistor is disposed electrically in parallel with the second voltage divider resistance element which is disposed between said second output node and said feedback means.

* * * * *